(No Model.)
A. D. DOBSON.
COMBINED STARTING, STOPPING, AND REVERSING GEAR FOR HOISTS, &c.
No. 557,776. Patented Apr. 7, 1896.
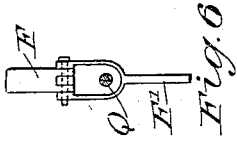
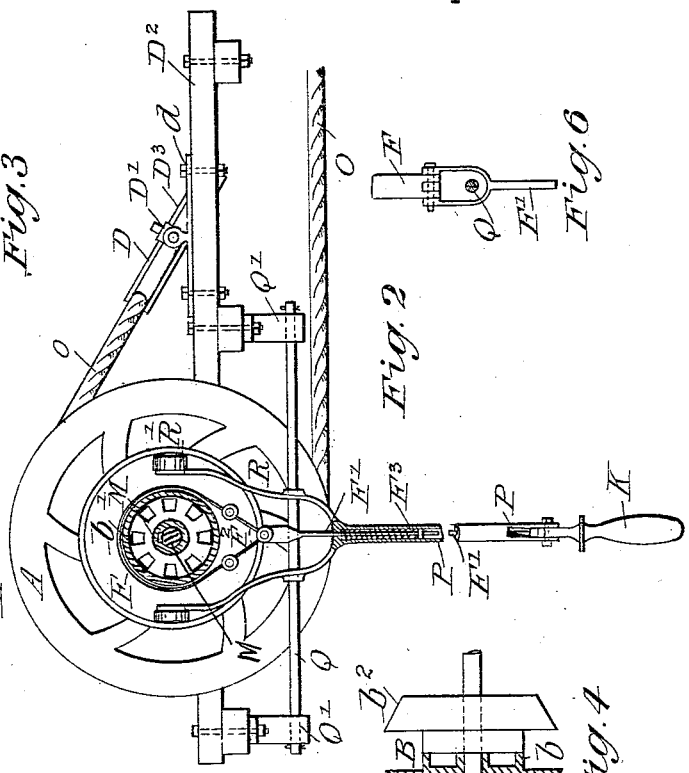
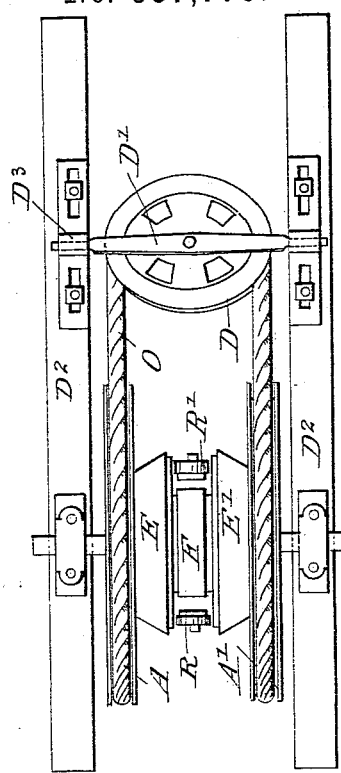
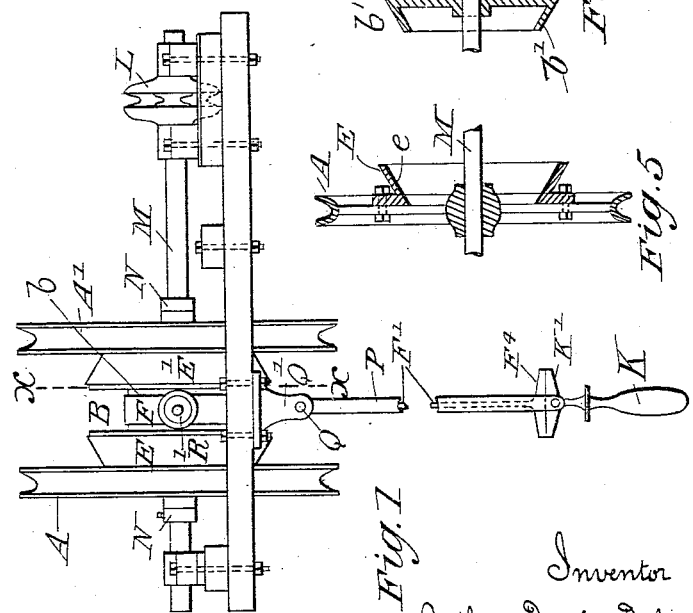
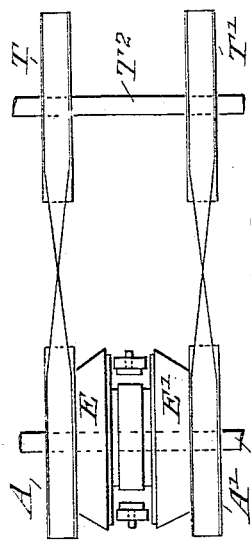
Witnesses
H. van Oldenneel
E. Giles
Inventor
Arthur Dudley Dobson
by
Attorneys

UNITED STATES PATENT OFFICE.

ARTHUR DUDLEY DOBSON, OF WARRNAMBOOL, VICTORIA.

COMBINED STARTING, STOPPING, AND REVERSING GEAR FOR HOISTS, &c.

SPECIFICATION forming part of Letters Patent No. 557,776, dated April 7, 1896.

Application filed November 4, 1895. Serial No. 567,903. (No model.) Patented in Victoria June 12, 1895, No. 12,263.

*To all whom it may concern:*

Be it known that I, ARTHUR DUDLEY DOBSON, engineer, a subject of the Queen of Great Britain and Ireland, and a resident of Lava Street, Warrnambool, in the British Colony of Victoria, have invented a certain new and useful Improved Combined Starting, Stopping, and Reversing Gear for Hoists and other Purposes, (for which I have obtained a patent in Victoria, No. 12,263, bearing date June 12, 1895,) of which the following is a specification.

This invention relates to an improved combined starting, stopping, and reversing gear for hoists and other purposes, and although it has been designed mainly for lifting light loads, such as those met with in butter factories and creameries, the gears may also be applied to hoists used for lifting heavy loads or to such as winding or steering gears.

In order that my invention may be well understood, I will now proceed to describe it, aided by a reference to the attached drawings, in which—

Figure 1 is a front elevation; Fig. 2, a sectional side elevation looking from line $x\,x$ of Fig. 1, and Fig. 3 a plan of my improved gears as applied to a hoist. Fig. 4 is a half side elevation and a half central vertical section of the sliding part of clutch and its brake-drum; Fig. 5, a central vertical section of the other half of clutch and its attached rope-pulley; Fig. 6, a detail side view of the upper part of the brake-rod; and Fig. 7 is a plan showing the pulleys driven by a belt in place of a rope.

The gears consist of a connected two-faced friction-clutch and brake-drum B and two rope-pulleys A and A', all of which are arranged on the hoist-shaft M, combined with a suitably-supported idle rope pulley D and a brake F and clutch-controlling lever P. The hoisting drum or sheave L is shown as usually arranged on aforesaid shaft M, and it may be either for rope or chain and may be furnished with pawls for holding the shaft in position. Each of said rope-pulleys A A' has half of the conical friction-clutch (marked E and E', respectively) formed or affixed on its side, and said pulleys run loosely on the hoist-shaft M, they being retained in position by fixed collars N N, while the pulleys are situated at such a distance apart as to admit of the double-ended conical and connected friction-clutch B working clear of them on shaft M. The body $b$, of lesser diameter between the conical-faced clutches $b'$ and $b^2$, forms the brake-drum, and such clutch-brake drum slides on a feather M', projecting from shaft M. Each of the half-clutches E and E' upon the pulleys A and A', respectively, has its inner conical surface lined or coated with leather $e$, in order that the sliding half of clutch may grip firmly when placed in gear. The idle-pulley D is centered on a pin carried by a transverse rock-bar D', mounted in bearings $D^3$, carried by a frame $D^2$, said bearings being adjustable in order that when so desired the driving rope or belt O may be tighened. To adjust the bearings $D^3$, the frame-bolts $d$ are released and the bearings are shifted back or forward, as the case may be, and when at the desired position they are again secured by the bolts $d$.

The driving-rope O passes around the idle-pulley D and over both rope-pulleys A and A', and consequently said pulleys rotate in opposite directions. The rope belt O has motion imparted to it in any ordinary manner. Supported in bracket-bearings Q' under the brake-drum B is a short transverse shaft Q, upon which the upper forked end R of the clutch-lever P is centered, and the upper ends of said fork have small friction-rollers R' upon them, which just fit between the back surfaces of the clutches $b'\,b^2$. The lower length of the clutch-lever P is tubular and terminates in a pivoted handle K, while within the tube is a rod F', the upper end of which is attached by links $F^2\,F^2$ to the brake-strap F, which passes around aforesaid brake-drum $b'$, said rod F' being drawn downward in order that the brake-strap F will grip the drum by a coiled spring $F^3$, secured and arranged within the tubular lever P. The lower pivoted handle K has a cross-head K' on it, which acts on a similar cross-piece $F^4$, formed on lower end of brake-rod F', so that immediately the lever is pulled by handle K to bring one face of sliding clutch into gear with the half-clutch on driving-rope pulley to rotate the hoist-shaft in the desired direction the brake-rod F' is also lifted to release the brake F from drum $b$, so that it may revolve freely. By pushing the lever in the opposite direction the clutch engages the opposite pulley, and the hoist-shaft will be revolved in the opposite direction.

In a modified arrangement, as shown in Fig. 7, the pulleys A and A′ are shown driven by belts from pulleys T and T′ on a shaft T², one of said belts being crossed to give the pulleys a reverse motion; also said pulleys A and A′ may be substituted by loose spur-wheels, which may be driven in any well-known manner to give opposite motions to each. Further, for winding or steering gears the wheels carrying the loose parts of the clutch may be driven by independent engines, and the winding being then controlled by my starting, stopping, and reversing gear would have the advantage that the attendant must remain at his post to operate the lever.

Having now described my invention, what I claim as new, and desire to secure by Letters Patent, is—

1. An improved starting, stopping and reversing gear consisting of the clutch-brake drum B, $b$, $b'$ and $b^2$ and the pulleys A, A′ with their attached conical-faced clutches E, E′, respectively, assembled on shaft M, combined with the adjustably-supported idle-pulley D and the combined clutch and brake-lever F P K, all assembled and arranged substantially as herein described and illustrated in the drawings.

2. In a starting, stopping and reversing gear, wheels or pulleys as A, A′ arranged to rotate reversely upon a shaft as M and having a clutch as B between them thereon, which is capable of clutching the wheels or pulleys and the latter combined with a suitably-supported idle-pulley as D, driven by a rope belt, said idle-pulley directing the rope about the pulleys A, A′ to turn the same in opposite directions substantially as and for the purpose herein described and as illustrated in the drawings.

3. In a starting, stopping and reversing gear, the combination of a clutch, a lever P pivotally supported and having at one end a fork R engaging the clutch, a pivoted handle at the opposite end of the lever P having a cross-bar K′, a brake-strap engaging the clutch and an operating-rod F′ therefor, carried by the lever P and having a cross-bar F⁴ to be engaged and operated by the bar K′ of the pivoted handle, substantially as described.

In witness whereof I have hereunto set my hand in presence of two witnesses.

ARTHUR DUDLEY DOBSON.

Witnesses:
   B. R. BODYCOMB,
   BEDLINGTON BODYCOMB.